United States Patent
Sbisa et al.

(10) Patent No.: US 6,760,426 B2
(45) Date of Patent: Jul. 6, 2004

(54) METHOD AND SYSTEM FOR HANDLING OPERATOR CALLS IN A COMMUNICATION NETWORK

(75) Inventors: Daniel Charles Sbisa, Blue Springs, MO (US); Keith Eric Fenton, Lee's Summit, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 581 days.

(21) Appl. No.: 09/755,455

(22) Filed: Jan. 5, 2001

(65) Prior Publication Data

US 2002/0090074 A1 Jul. 11, 2002

(51) Int. Cl.[7] .......................... H04M 3/523; H04M 7/00
(52) U.S. Cl. ............. 379/221.09; 345/708; 379/265.02; 379/265.13
(58) Field of Search .......................... 345/708; 379/219, 379/220.01, 221.08, 221.09, 265.01, 265.02, 265.12, 265.13

(56) References Cited

U.S. PATENT DOCUMENTS

| | | | |
|---|---|---|---|
| 5,694,463 A | 12/1997 | Christie et al. ........ 379/221.09 |
| 5,793,853 A | 8/1998 | Sbisa ......................... 379/120 |
| 5,923,745 A * | 7/1999 | Hurd ...................... 379/265.02 |
| 5,926,538 A * | 7/1999 | Deryugin et al. ...... 379/265.03 |
| 5,933,486 A | 8/1999 | Norby et al. .......... 379/221.09 |
| 6,470,081 B1 * | 10/2002 | Sbisa et al. ............ 379/221.09 |
| 6,611,590 B1 * | 8/2003 | Lu et al. ................. 379/265.09 |

OTHER PUBLICATIONS

Briere, Daniel, ""Sprint plans 'sweeping' network revisions"," Network World, vol. 10 (No. 38), p. 1 and 10, (Sep. 20, 1993).

* cited by examiner

Primary Examiner—Harry S. Hong

(57) ABSTRACT

A method and system for handling a call in a communications network that requires operator assistance. The system comprises a service control point, an operator server and a context server. The operator server dynamically selects an optimal operator center from a plurality of available operator centers for the call based on context information. The operator server then provides information on the selected operator center to the service control point, which generates call handling information for the call that causes the communications network to route the call to the selected one of the operator centers. The context server manages the context information for the call.

60 Claims, 8 Drawing Sheets

METHOD AND SYSTEM FOR HANDLING OPERATOR CALLS IN A COMMUNICATION NETWORK

RELATED APPLICATIONS

Not Applicable

FEDERALLY SPONSORED RESEARCH OR DEVELOPMENT

Not Applicable

BACKGROUND OF THE INVENTION

1. Field of the Invention

The invention is related to the field of communications, and in particular, to a method and system for handling calls in a communication network that require operator assistance.

2. Background

In a communications network, a Service Control Point (SCP) provides call routing information to telecommunications switches. In a typical call routing operation, the telecommunications switch receives a call request and transmits a query message to the SCP. The SCP processes the query message and returns a response message containing the routing information to the switch. For example, the switch may receive an "800" number call and query the SCP with the "800" number. The SCP processes the "800" number and returns a routing number to the switch. These query and response messages are typically Signaling System #7 (SS7) Transaction Capabilities Application Part (TCAP) messages that are well known in the art.

In some call scenarios, the communications network also uses a telecommunications resource to provide services to a call before the call is routed to a destination. An operator center is one example of a telecommunications resource used to provide these services. In some instances operator centers comprise several individual operators working at individual operator workstations to provide the various services to calls. In other instances the operator center is automated and provides the services using one or more voice response units.

To connect a call to an operator center, the communications network often obtains routing information from an SCP. The routing information can be information on a switch and connection coupled to the operator center. The operator center typically provides a service to the call based on the called and calling number that are provided over the connection. When the operator service is completed, the operator center directs the network to use a new connection to extend the call to the call destination.

To determine how to handle a call, it is desirable to provide context information to the operator center. The context information is information related to the call that is collected or generated by the various devices in a communications network. Some examples of context information are: the call ID, template ID, TCAP message transaction ID, originating switch ID, SCP ID, call detail record (CDR) record type, called number, nature of the called number, calling number, nature of the calling number, account codes, authorization codes, credit card numbers, calling card numbers, query class, query sequence number, service type, call-leg sequence, DNIS, and out-dial number. The context information for the call is typically stored in the SCP or in a remote context server.

FIG. 1 illustrates an example of a call session that requires an operator service to complete the call. On FIG. 1 the caller 101 places a call to the destination 102. In response to the call placement, a call request 106 is provided to the telecommunications switch 103. In response to determining the call request is an operator call request that requires information from the SCP 100, the telecommunications switch 103 processes the call request 106 to generate a query message 107 for the SCP 100. The query message 107 includes a request for call handling information for the call. The SCP 100 receives the query message and generates call handling information for the call, which includes routing instructions for the switch 103. The SCP 100 generates a response message 108 that contains the call handling information and transmits the response message 108 to the switch 103. The call handling information causes the switch 103 to extend the call over the connection 110 to the operator center 105.

The operator center 105 receives the call over the connection 110 and processes the call to provide a service to the call. After providing the service, the operator center 105 generates a transfer message 109 for the SCP 100. The SCP 100 receives the transfer message 109 and processes the transfer message 109 to select call handling information for the call. The SCP 100 generates a response message 111 that contains the call handling information and transmits the response message 111 to the switch 103. The call handling information causes the switch 103 to disconnect the operator center 105 and extend the call over connection 112 to the destination 102 to complete the call.

Unfortunately, the connection 110 between the operator center 105 and switch 103 is a proprietary connection that supports unique functionality between the switch 103 and the operator center 105. Thus, the switch 103 cannot support tandem routing to allow the switch 103 to route a call to other operator centers connected to other switches.

It is also known in the art to use an on-site routing node at an operator center that communicates with an SCP to provide call routing to individual operators at the operator center. For example, a technical support department of a company that has a large number of individual operators might use an on-site routing node to route incoming calls to specific operators. This prevents calls from being routed to an operator who is on a lunch break or not currently at an operator station. When an operator will not be at the operator station, the operator sends a message to the on-site routing node. The on-site routing node then will not route calls to that operator station.

Unfortunately, context information is not available to the on-site routing node during the selection of an operator at the operator center. Therefore a need exists in the art for a method and system for handling calls in a communications network that require operator assistance.

SUMMARY

The present invention solves the problems outlined above and advances the art by providing a method and system for handling calls that require operator assistance in a communications network. The present method and system utilizes an operator server to dynamically select an optimal operator center from a plurality of available operator centers for a call based on the available context information for the call. The operator server then provides information on the selected operator center to a Service Control Point (SCP), which generates call handling information for the call that causes the communications network to route the call to the selected one of the operator centers. In some examples of the present method and system, the operator server could select an optimal group of operator centers from the plurality of available operator centers for the call based on the available context information. In this case, the operator server provides information on the selected group of operator centers to the SCP, which selects one of the selected group of operator centers for the call and generates call handling information that causes the communications network to route the call to the selected one of the operator centers.

A first advantage of the present method and system is the distribution of calls requiring operator assistance to the most appropriate operator center equipped to handle the call based on the context information for the call. For example, the nature of the call could be such that a human operator center would be the optimal operator center to handle the call. In other examples, the nature of the call could be such that an automated operator center would be the optimal operator center to handle the call. Advantageously, the operator server uses the context information for the call to select the most appropriate one and type of operator center to handle a specific call. A second advantage of the present invention, is that the operator server could monitor the plurality of operator centers to select an operator center based on both the most optimal equipped operator center and the current call volume of the plurality of operator centers. Advantageously, this results in more efficient call processing in the communications network.

Figure 1:
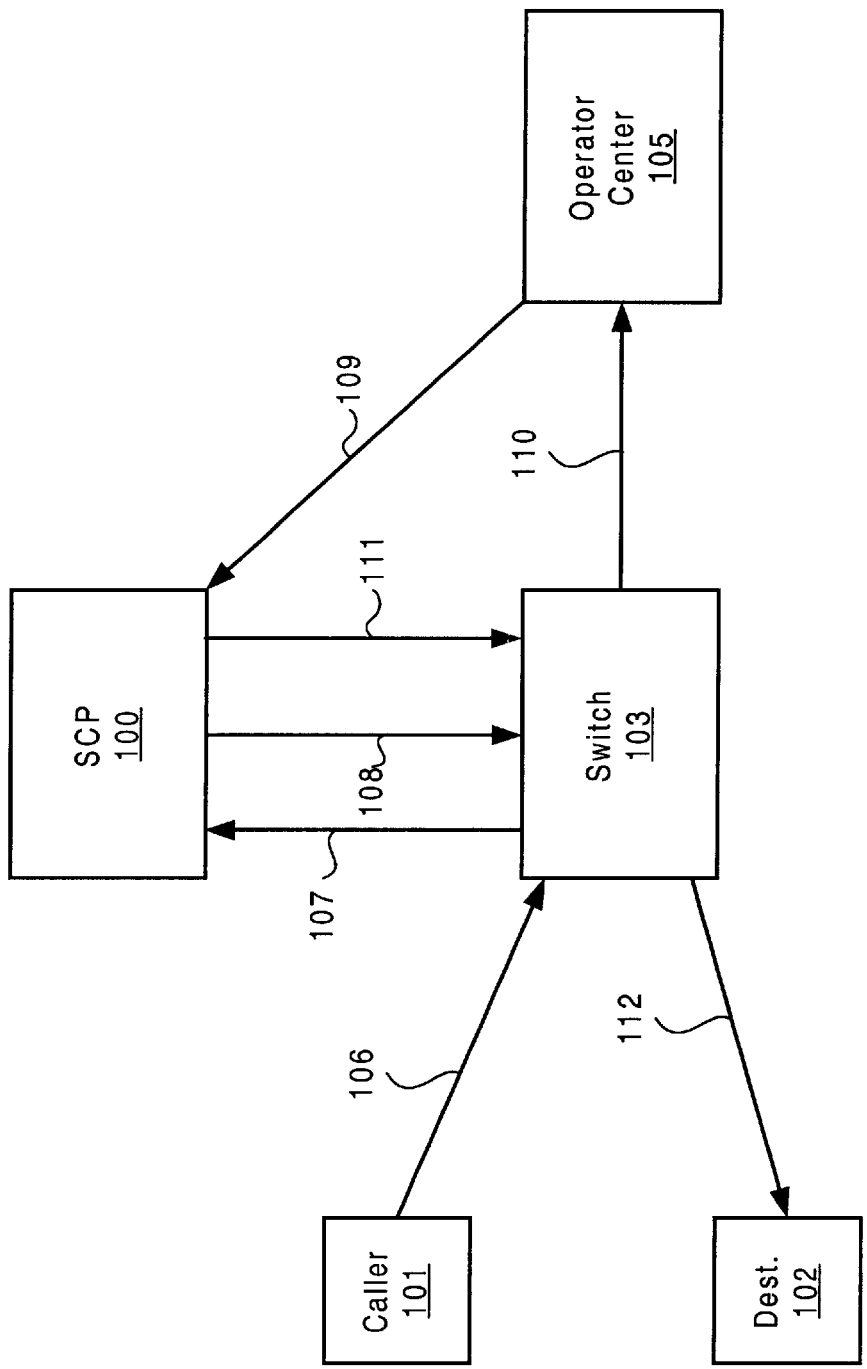
FIG. 1 is a prior art block diagram illustrating a call requiring operator assistance in a communications network.
Figure 2:
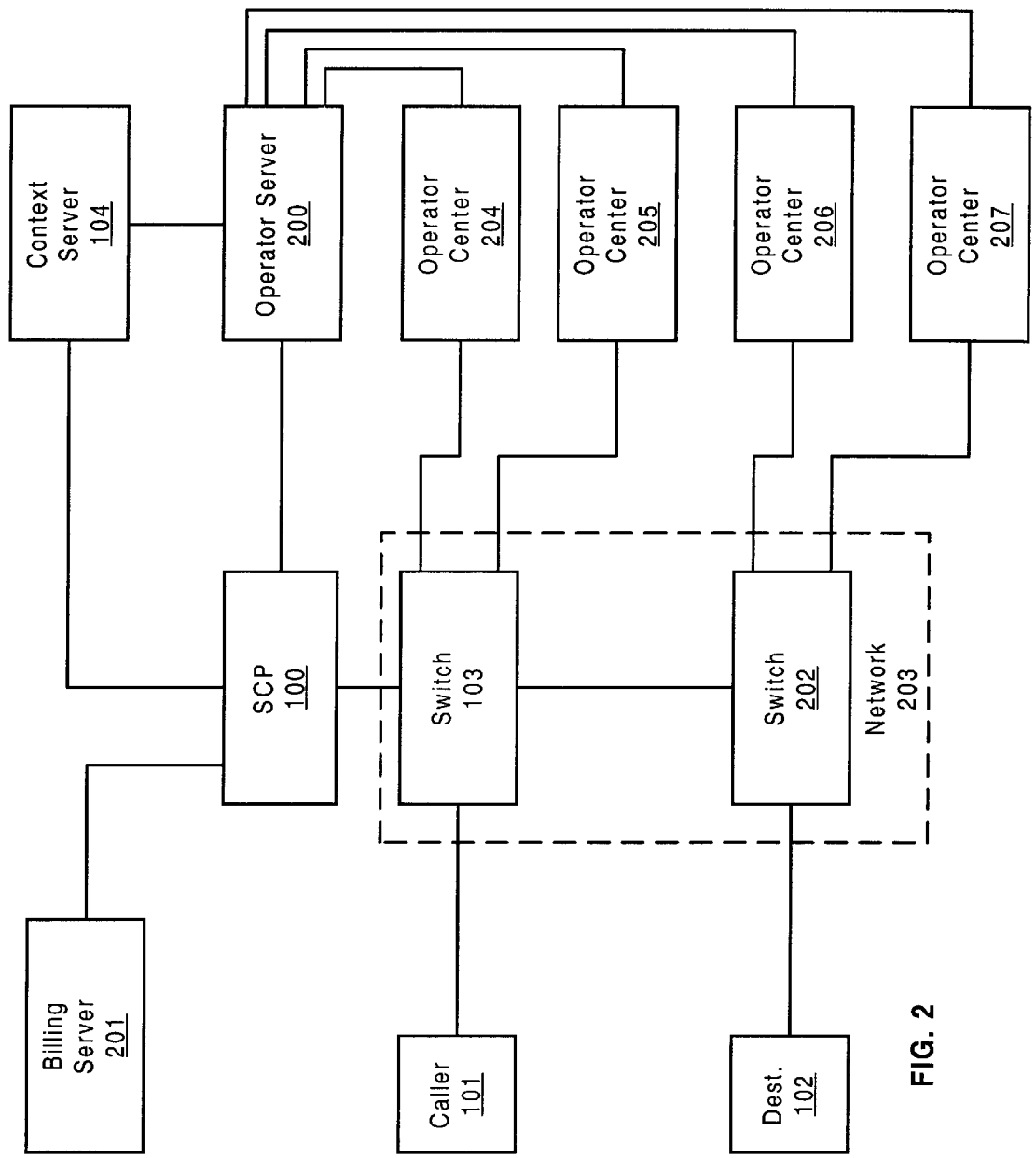
FIG. 2 is an example of a network architecture for a telecommunication system according to the present invention.

DETAILED DESCRIPTION
Network Architecture—FIG. 2

FIG. 2 depicts a network 203, an SCP 100, a caller 101, a billing server 201, a destination 102, a context server 104, an operator server 200 and operator centers 204–207. The network 203 comprises a switch 103 connected to another switch 202. The switch 103 is connected to the SCP 100, the caller 101, and the operator centers 204 and 205. The switch 202 is connected to the destination 102 and the operator centers 206 and 207. The SCP 100 is connected to the operator server 200, the billing server 201, and the context server 104. The operator server 200 is connected to the context server 104 and the operator centers 204–207. It will become apparent from the following description that in some examples of the present method and system, the context server 104 is also connected to the operator centers 204–207 although this is not shown on FIG. 3 for clarity. Those skilled in the art will appreciate that there are typically numerous callers, destinations, and other conventional components associated with a communications network that are also not shown on FIG. 3 for reasons of clarity.

The switches 103 and 202 are network elements that are capable of extending and disconnecting communications paths in response to signaling messages. The switches 103 and 202 are linked with one another to exchange signaling messages. An example of the signaling messages include without limitation, Signaling System #7 (SS7). Some examples of the switches 103 and 202 are class 4 switches, ATM switches, and wireless switches. One specific example of a class 4 switch is the DMS-250 that is supplied by Nortel. The switches 103 and 202 extend communications paths over connections such as dedicated access lines, ISDN connections, DS0 connections, ATM connections, and wireless connections.

The SCP 100 is a processing system that receives query and transfer messages and returns response messages. Typically, the query and response messages are well known SS7 TCAP messages. One example of the SCP 100 is an SCP supplied by the Tandem Corporation that is configured and operated according to the following disclosure. The SCP 100 is linked to the switch 103 over a link with one example being an SS7 link. The context server 104 is a processing system for storing and providing context information for calls with one example being a TCP/IP server. The billing server 201 could be any server configured to receive and store billing information for calls.

The operator centers 204–207 are conventional operator centers that provide a variety of services to calls. Some examples of the operator services include without limitation, collect calls, third party billed calls, calling card billed calls, station to station calls, and person-to-person calls. In some examples of the invention, the operator centers 204–207 could comprise automated operator centers using interactive voice response technology and speech recognition to provide the various operator services. In other examples of the present invention, the operator centers 204–207 could comprise one or more human operators and operator workstations. In yet other examples of the present invention, some of the operator centers 204–207 could comprise automated operator centers while other ones of the operator centers 204–207 could comprise human operators and operator workstations.

Figure 3:
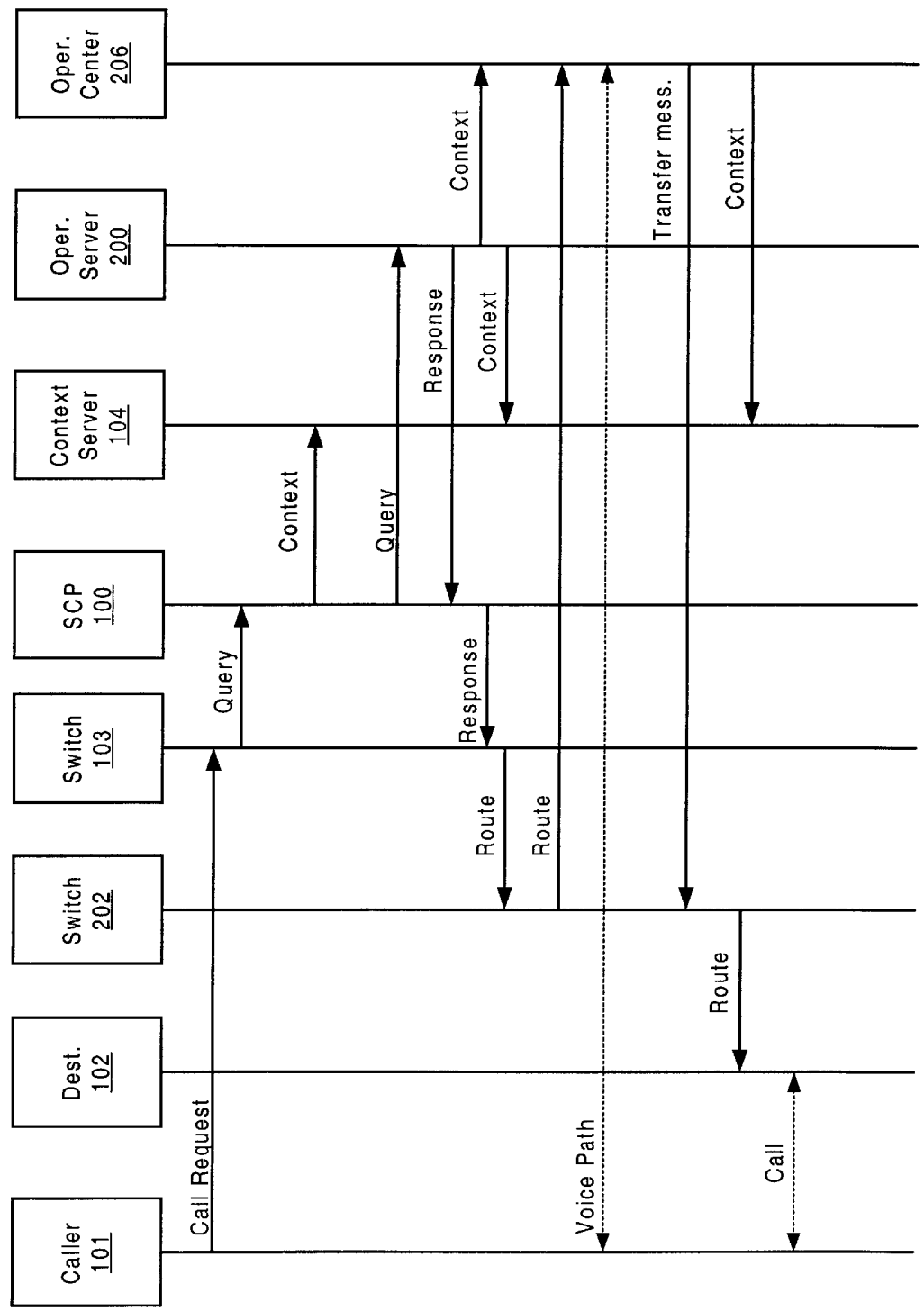
FIG. 3 is a message sequence chart illustrating an example of the operation of a telecommunication system according to the present invention.

Aside from the modifications for the invention disclosed herein, the components and connections depicted on FIG. 3 are conventional and well known in the art. Those skilled in the art recognize that there are numerous variations of the components and architecture depicted on FIG. 3 that also include a service control processing system, a switching system, an operator server, and operator centers. The invention is not restricted to the specific components and architecture depicted on FIG. 3, but applies to the various related architectures and components containing a service control processing system, a switching system, an operator server, and operator centers.

Figure 4:
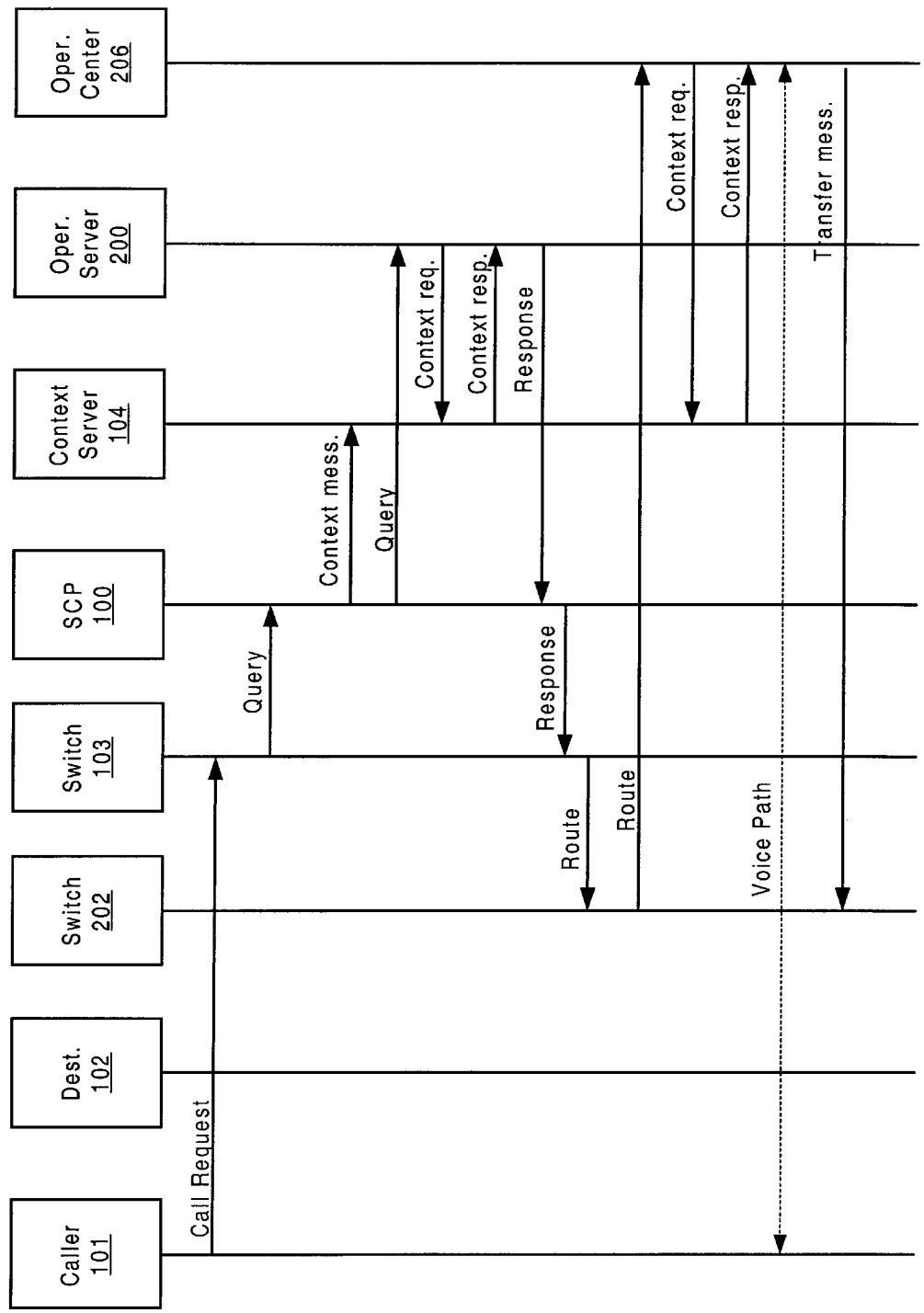
FIGS. 4 and 5 are a message sequence chart illustrating another example of the operation of a telecommunication system according to the present invention.

Network Operations—FIGS. 4–8:

FIG. 4 is a message sequence chart that depicts the operation of the invention in some embodiments. It is anticipated however, that one skilled in the art will recognize numerous other examples in accordance with the principles described below, and thus, the following examples are for the purpose of illustration and not limitation. Those skilled in the art will also appreciate that various features described below could be combined to form multiple variations of the invention.

On FIG. 4, the caller 101 places a call to the call destination 102. In response to the call placement, a call request enters the network 203 and is received by the switch 103. The switch 103 processes the call request, and as a result, the switch 103 triggers and sends a query message for the call to the SCP 100. The SCP 100 receives and processes the query message to determine that the call requires operator assistance for completion. The SCP 100 also assigns a unique call ID to the call that is used to associate context information and messages with the call.

Context information can either be stored in the SCP 100 or in the context server 104. A context location indicator in the SCP 100 and the first digit of the call ID could identify the device that stores the context information for the call. In this example, the context information is stored in the context server 104. Thus, the SCP 100 establishes context information for the call by generating a context information message containing the context information. The SCP 100 transmits the context information message to the context server 104. The context information message establishes context information for the call in the context server 104. The context server 104 receives and stores the context information under the call ID.

The SCP 100 also generates a second query message and transmits the second query message to the operator server 200. The second query message includes a request for an operator center to handle the call and includes the context information for the call. The operator server 200 processes the second query message to determine an optimal one of the operator centers 204–207 to handle the call based on the context information provided in the second query message. For example, the nature of the call could be such that an automated operator center would be the optimal operator center to handle the call. In another example, the nature of the call could be such that a human operator is required to handle the call. In determining the optimal one of the operator centers 204–207, the operator server 200 processes the second query message to determine if enough context information is provided in the second query message to select the optimal one of the operator centers 204–207. In this case, sufficient context information exists for the call and the operator server 200 generates a response message for the SCP 100 that includes information on the selected one of the operator centers 204–207. The operator server 200 also generates and provides a context information message to the selected one of the operator centers 204–207. In this case operator center 206. The operator server 200 also generates and provides a context information message for the context server 204. The context server 204 processes the context information message to update the context information for the call.

The SCP 100 processes the response message to generate call handling information that includes routing instructions to the selected one of the operator centers 204–207. Typically, the routing instructions are the identity of a connection to the selected operator center, e.g. 206, or the identity of a switch, e.g. 202, and connection that are connected to the selected operator center, e.g. 206. The SCP 100 generates a second response message for the switch 103 that includes the call handling information. The switch 103 receives the response message from the SCP 100 and processes the response message to route the call to the switch 202. The switch 202 in turn routes the call to the operator center 206 and establishes a voice path between the selected operator center 206 and the caller 101. The operator center 206 processes the call using the context information provided by the operator server 200 to provide the required service to the call. In response to providing the required service to the call, the operator center 206 provides a transfer message to the switch 202. The transfer message contains the information required by the switch 202 to select a new connection. For example the transfer message could contain an out-dial number for the call destination 102. An out-dial number is typically a conventional telephone number. The operator center 206 also provides a context message to the context server 104. The context server 104 processes the context message to update the context information for the call. The switch 202 processes the transfer message to route the call to the destination 102 and complete the call between the caller 101 and the destination 102.

Figure 5:
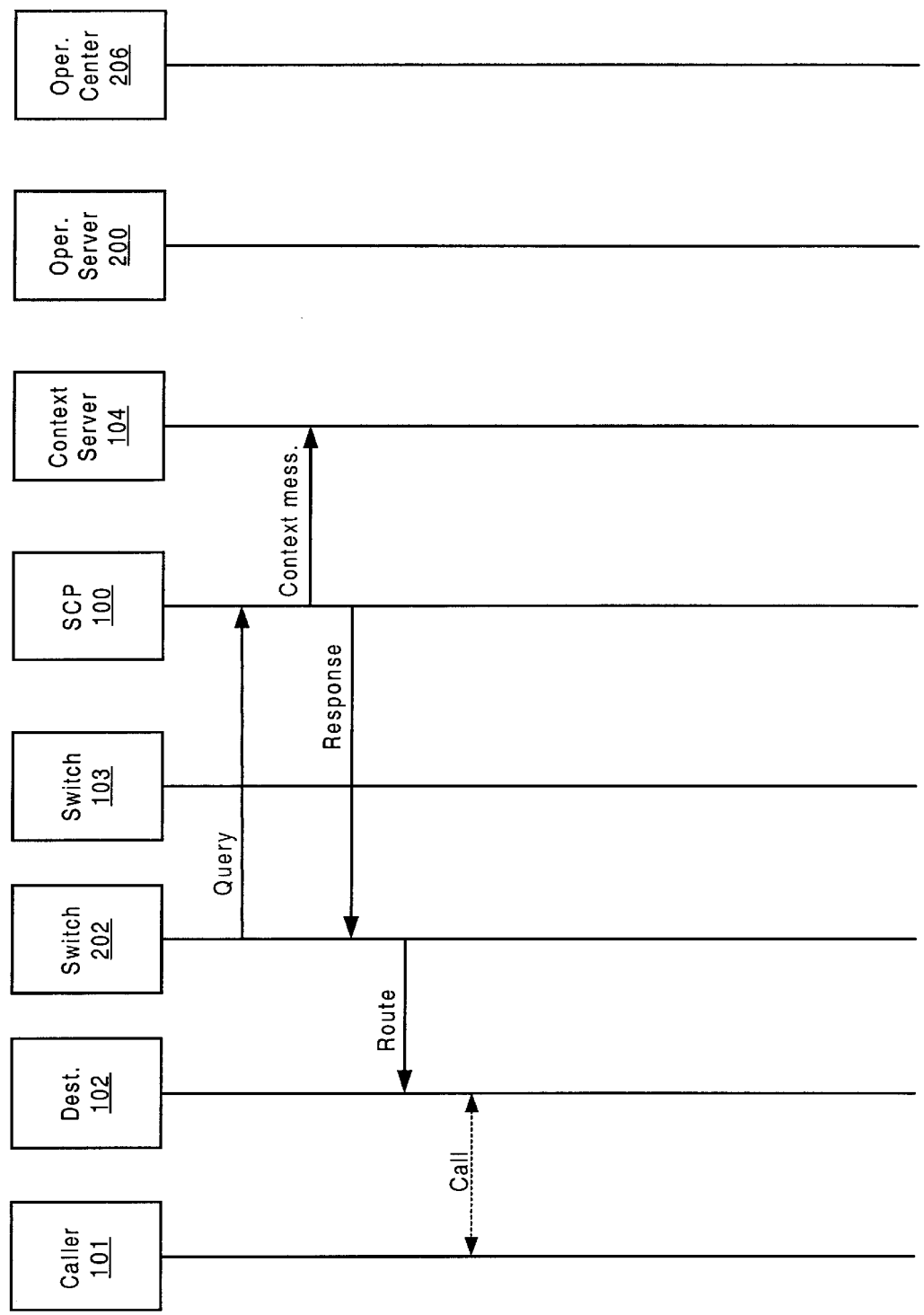
Figure 6:
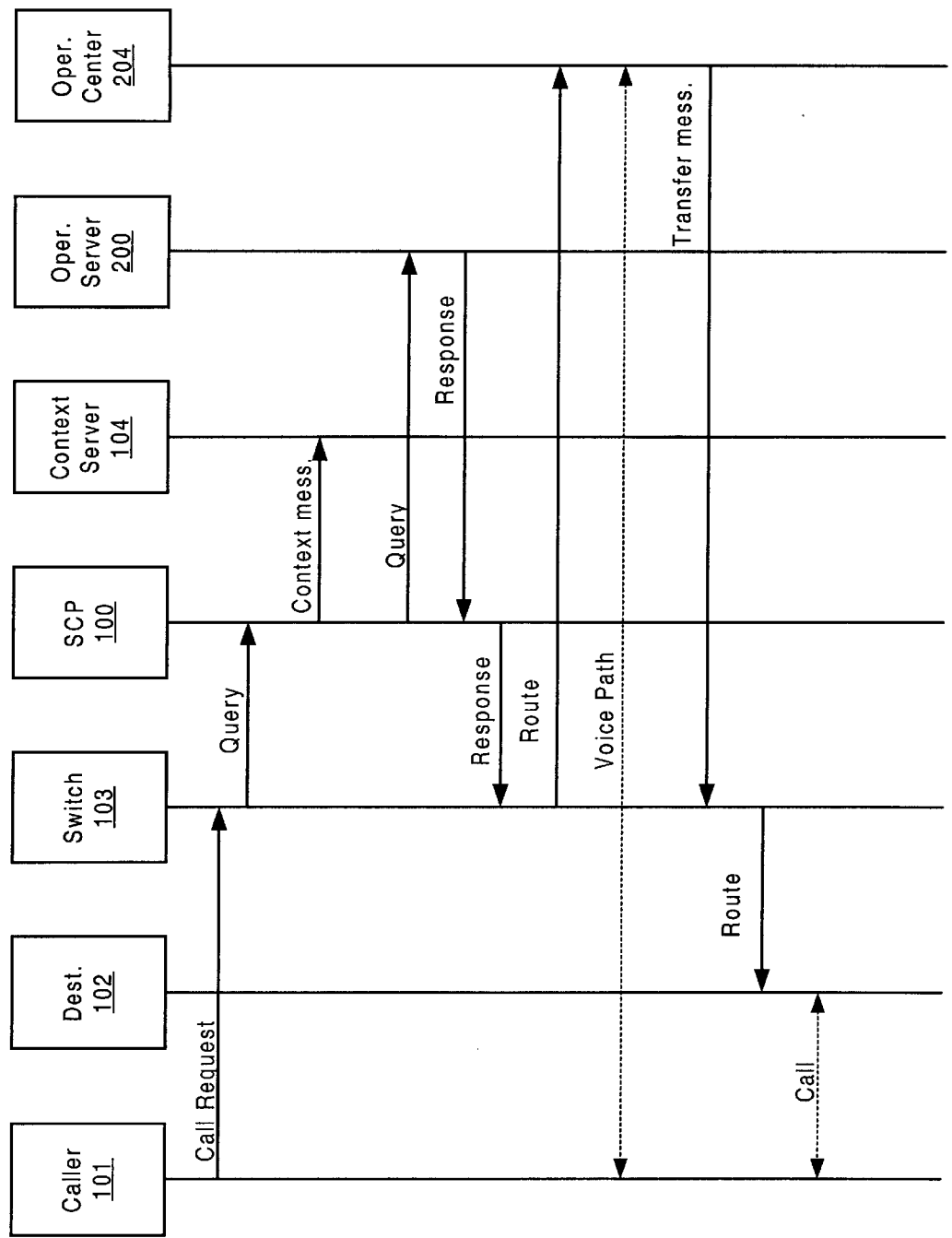
FIG. 6 is a message sequence chart illustrating another example of the operation of a telecommunication system according to the present invention.

FIGS. 5 and 6 are a message sequence chart that depicts additional examples of the operation of the invention. In the examples of FIGS. 5 and 6, the switch 202 re-queries the SCP 100 for routing information, and the operator center 206 queries the context server 104 for the context information rather than receive the context information from the context server 104.

On FIG. 5, the caller 101 places a call to the call destination 102. In response to the call placement a call request enters the network 203 and is received by the switch 103. The switch 103 processes the call, and determines that an operator service is required. The operator service could be identified through the dialing pattern of the call, such as where a leading "0" or a "0" with no appended digits is dialed. As a result, the switch 103 assigns a trigger index value to the call and sends a query message for the call to the SCP 100. The trigger index value is used by the SCP 100 to determine that the call requires operator assistance. The SCP 100 receives and processes the query message to assign a unique call ID to the call that is used to associate context information and messages with the call. The SCP 100 also establishes context information for the call and generates a context information message containing the context information. The SCP 100 transmits the context information message to the context server 104. The context information message establishes context information for the call in the context server 104. The context server 104 receives and stores the context information under the call ID.

The SCP 100 generates a second query message and transmits the second query message to the operator server 200. The second query message includes a request for an operator center to handle the call and includes the context information for the call. The operator server 200 processes the second query message to determine if enough information is provided in the second query message to select the optimal one of the operator centers 204–207. For example, where the call is a re-origination call, context information from the prior call attempt could be available and used to select the optimal one of the operator centers 204–207. In this case additional information is available and the operator server 200 generates and provides a context request message to the context server 104. The context request message contains the call ID and a template ID provided to the operator server 200 by the SCP 100 in the query message. The template ID indicates the set of information required by the operator server 200. For example, a template ID of "1" requests a set of context information including: the call ID, the template ID, the originating switch ID, the called number, the calling number, the call-leg count, and the record type. Other template IDs could be used to request additional information such as the SCP ID, the query class, and resource information.

The context server 104 receives the context request message and uses the call ID to retrieve the context information for the call. The context server 104 uses the template ID to select the set of context information to provide in a context response message to the operator server 200 and provides the context response message to the operator server 200. The operator server 200 processes the context information to determine the optimal one of the operator centers 204–207 to handle the call. In some examples of the invention, the operator server 200 could also monitor the operator centers 204–207 for call volume and use the call volume information to select the optimal operator center to handle the call based on call volume and the context information. The operator server 200 then generates and transmits a response message for the SCP 100 that includes information on the selected one of the operator centers 204–207. In this case the operator center 206.

The SCP 100 processes the response message to generate call handling information that includes routing instructions to the selected one of the operator centers 204–207. The SCP 100 generates and transmits a second response message to the switch 103 that includes the call handling information. The switch 103 receives the response message from the SCP 100 and routes the call to the switch 202. In response to the call routing, the switch 202 routes the call to the selected operator center 206 and establishes a voice path between the selected operator center 206 and the caller 101. Typically, the route message to the operator center 206 consists of a series of digits that are out-pulsed from the switch 202 to the operator center 206 over the connection. For example, the out-pulsed digits could indicate the call ID to the operator center 206. In this example the operator center 206 does not receive the context information from the operator server 200. Rather, the operator center 206 processes the call to generate a second context request message for the context server 104. The context server 104 receives the second context request message and uses the call ID to retrieve the context information. The context server 104 uses the template ID to select a set of context information to provide in a context response message to the operator center 206.

In response to receiving the context response message, the operator center 206 processes the call to provide the required service to the call using the context information. In response to providing the required service to the call, the operator center 206 provides a transfer message to the switch 202. Referring to FIG. 6, the switch 202 receives the transfer message and processes the transfer message to determine that additional call handling instructions are required to complete the call. For example, the transfer message could include an "800" out-dial number requiring translation into a call destination number by the SCP 100. The switch 202 processes the transfer message to send a second query message for the call to the SCP 100. The SCP 100 receives and processes the query message to generate second call handling instructions for the call that include instructions to route the call to the call destination 102. The SCP 100 provides the second call handling information to the switch 202 in a response message and generates and transmits another context information message to the context server 104. The context server 104 processes the context message to update the context information for the call.

In response to receiving the second call handling information from the SCP 100, the switch 202 disconnects the operator 206 and extends the call to the destination 102. In some examples of the invention, the switch 202 could also send a message to the SCP 100 that the operator center has been disconnected.

Figure 7:
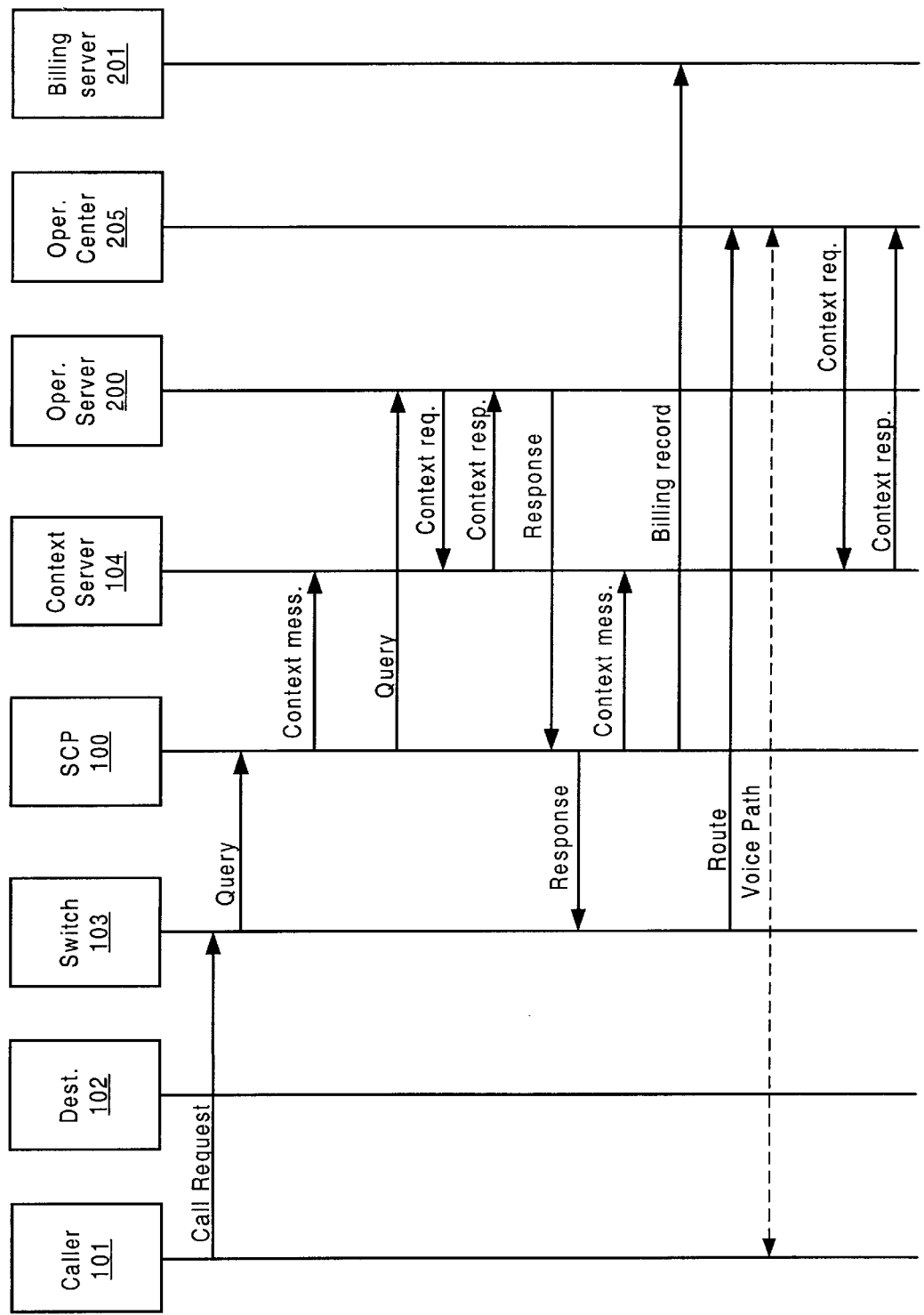
FIGS. 7 and 8 are a message sequence chart illustrating another example of the operation of a telecommunication system according to the present invention.

FIG. 7 is a message sequence chart that depicts another example of the operation of the invention in some embodiments. On FIG. 7, the caller 101 places a call to the call destination 102. In response to the call placement a call request enters the network 203 and is received by the switch 103. The switch 103 processes the call request, and as a result, the switch 103 triggers and sends a query message for the call to the SCP 100. The SCP 100 receives and processes the query message to determine that the call requires operator assistance for completion. The SCP 100 also assigns a unique call ID to the call that is used to associate context information and messages with the call.

The SCP 100 generates a second query message and transmits the second query message to the operator server 200. The second query message includes a request for an operator center to handle the call and includes context information for the call. In this case the operator server 200 processes the second query message determine an optimal group of operator centers from the available operator centers 204–207 to handle the call based on the context information provided in the second query message. For example, the operator server 200 could select operator centers 204 and 205 and generate and provide a response message to the SCP 100 with information on the selected group of operator centers, in this case operator center 204 and 205.

The SCP 100 processes the response message to select one of the operator centers 204 and 205 to handle the call. The SCP 100 also generates call handling information that includes routing instructions to the selected one of the operator centers 204 and 205. In this case operator center 204. The SCP 100 generates a second response message for the switch 103 that includes the call handling information. The switch 103 receives the response message from the SCP 100 and processes the response message to route the call to the selected operator center 204 and establishes a voice path between the selected operator center 204 and the caller 101. It should be noted that the context information for the call could be provided by the operator server 200, as in the example of FIG. 4, or could be retrieved by the selected operator center 204, as in the example of FIGS. 5 and 6, as a matter of design choice. The operator center 204 processes the call to provide the required service to the call. In response to providing the required service to the call, the operator center 204 provides a transfer message to the switch 103. The switch 103 processes the transfer message to disconnect the operator center 204 route the call to the destination 102 and complete the call between the caller 101 and the destination 102. If additional call handling information is required to route the call, the switch 103 could query the SCP 100 as in the examples of FIGS. 5 and 6 or could use internal processing logic to route the call.

Figure 8:
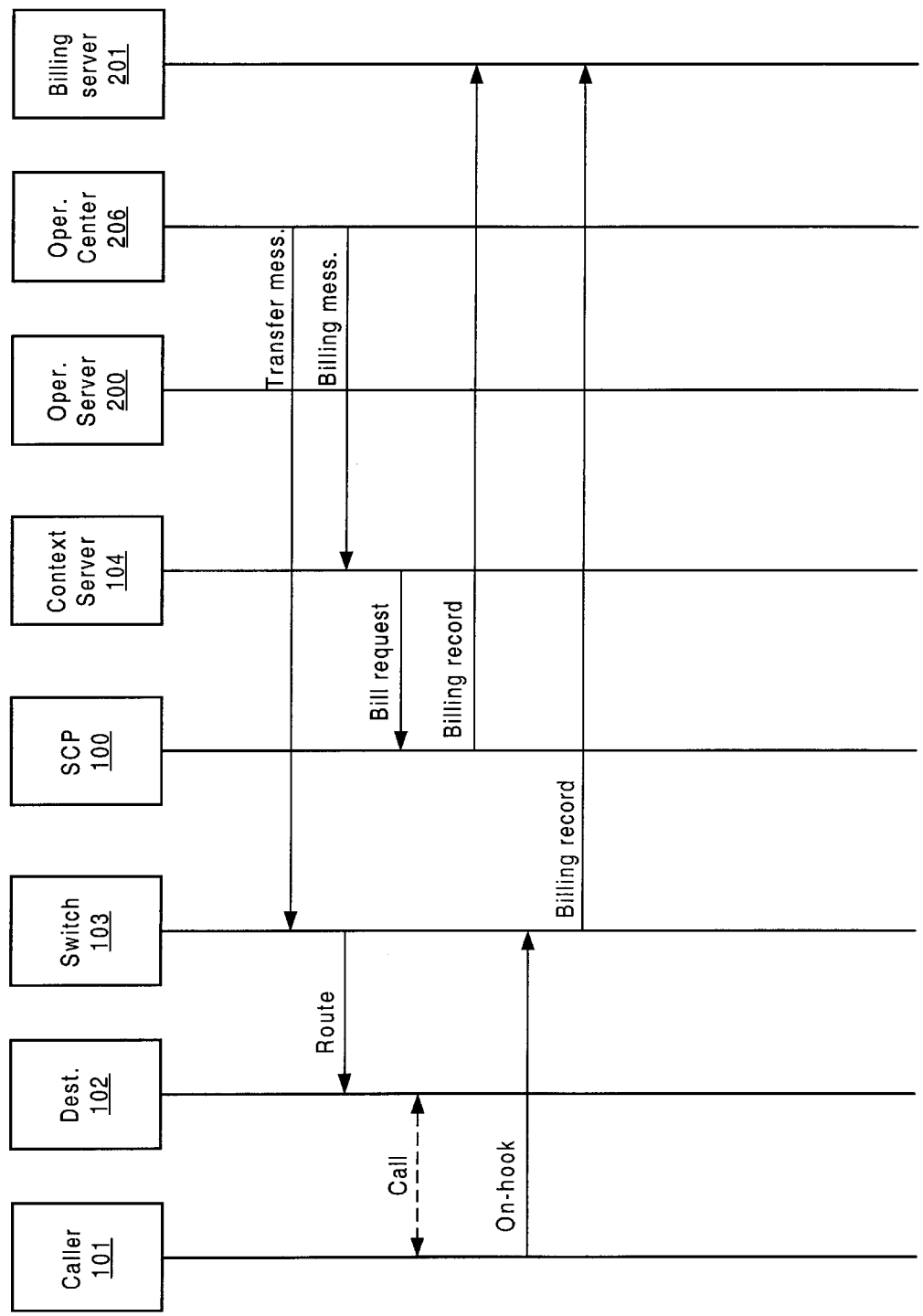

FIG. 8 is a message sequence chart that depicts another example of the operation of the invention in some embodiments. On FIG. 8 the caller 101 places a call to the call destination 102. In response to the call placement a call request enters the network 203 and is received by the switch 103. The switch 103 processes the call request, and as a result, the switch 103 triggers and sends a query message for the call to the SCP 100. The SCP 100 receives and processes the query message to determine that the call requires operator assistance for completion. The SCP 100 also assigns a unique call ID to the call that is used to associate context information and messages with the call.

The SCP 100 also generates a second query message and transmits the second query message to the operator server 200. The second query message includes a request for an operator center to handle the call and includes the context information for the call. The operator server 200 processes the second query message to determine if enough information is provided in the second query message to select the optimal one of the operator centers 204–207. In this case additional information is available and the operator server 200 generates and provides a context request message to the context server 104. The context server 104 receives the context request message and uses the call ID to retrieve the context information. The context server 104 uses the template ID to select a set of context information to provide in a context response message to the operator server 200. In response to receiving the context response message, the operator server 200 processes the second query message determine an optimal operator center from the available operator centers 204–207 to handle the call based on the context information. The operator server also generates and provides a response message to the SCP 100 with information on the selected operator center. In this case operator center 205. The SCP 100 processes the response message to generate call handling information that includes routing instructions to the selected operator center 205 and provides a second response message to the switch 103 that includes the call handling information. The SCP 100 then provides a context information message to the context server 104 with updated context information for the call. Additionally, in this example, the SCP 100 also generates a billing record for the call and provides the billing record to the billing server 201. The billing server 201 processes the billing record to generate a billing file for the call and stores the billing file.

In response to receiving the second response message from the SCP 100, the switch 103 processes the response message to route the call to the selected operator center 205 and establishes a voice path between the selected operator center 205 and the caller 101. In this example, the operator center 205 does not receive the context information from the operator server 200. Rather as in the above example, the operator center 205 processes the call to generate a context request message for the context server 104. The context server 104 receives the second context request message and uses the call ID to retrieve the context information provides the context response message to the operator center 205. Referring to FIG. 9, the operator center 205 then processes the call to provide the required service to the call. In response to providing the required service to the call, the operator center 205 provides a transfer message to the switch 103. The switch 103 processes the transfer message to route the call to the destination 102 and complete the call between the caller 101 and the destination 102. In response to providing the transfer message, the operator center 205 also generates and provides a billing information message to the context server 104 that includes billing information for the call. The context server 104 processes the billing information message to store the billing information in the context file and generates and provides a billing request message to the SCP 100. The SCP 100 processes the billing request message to generate another billing record for the billing server 201. The billing server 201 processes the billing record to update the billing file for the call.

In response to an on-hook message from the caller 101, the switch 103 processes the on-hook message to generate a billing record for the call and provides the billing record to the billing server 201. The billing server 201 processes the billing record to complete the billing file for the call.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. A method for handling a call in a communications network that require operator assistance using a Service Control Point ("SCP"), the method comprising:

receiving a first query message in the SCP from the communications network, wherein the first query message includes a request for first call handling information for the call;

processing the first query message in the SCP to establish context information for the call, provide the context information to a context server, and generate a second query message for an operator saver, wherein the second query message includes a request for an optimal operator center;

receiving the second query message in the operator server;

processing the second query message in the operator server to retrieve the context information for the call from the context server, select an optimal operator center for the call from a plurality of available operator centers based on the context information, and generate a first response message for the SCP that indicates the selected operator center;

receiving the first response message in the SCP and processing the first response message to generate a second response message for the communications network that includes the first call handling information; and transmitting the second response message to the communications network, wherein the first call handling information causes the communications network to route the call to the selected operator center.

2. The method of claim 1 further comprising:

in the operator server, processing the second query message to generate a context information message for the selected operator center that includes the context information for the call and providing the context information message to the selected operator center.

3. The method of claim 1 wherein processing the second query message in the operator server to retrieve the context information for the call comprises:

generating and transmitting a first context request message to the context server; and receiving a first context response message from the context server that includes the context information for the call.

4. The method of claim 3 further comprising:

receiving the call in the selected operator center;

processing the call in the selected operator center to generate and provide a second context request message for the context server that includes a request for the context information for the call; and receiving a second context response message that includes the context information for the call.

5. The method of claim 4 further comprising:
processing the call in the selected operator center to provide a service to the call; and
in response to providing the service, generate and transmit a transfer message to the communications network, wherein the transfer message causes the telecommunication's network to extend the call over a new connection to a call destination.

6. The method of claim 5 wherein extending the call over the new connection comprises:
connecting the call to the call destination using an out-dial number included in the transfer message.

7. The method of claim 5 wherein extending the call over the new connection comprises:
generating and transmitting a third query message to the SCP that includes a request for second call handling information for the call; and
receiving the third query message in the SCP and processing the third query message to generate a third response message for the communications network that includes the second call handling information, wherein the second call handling information includes instructions to extend the call over the communication network to the call destination.

8. The method of claim 1 further comprising:
in the operator server, processing the second query message to select an optimal group of operator centers from the plurality of available operator centers based on the context information; and
generating the first response message for the SCP that indicates the selected group of operator centers.

9. The method of claim 5 further comprising:
in response to generating the second response message for the communications network in the SCP, generating second context information in the SCP for the call and providing the second context information to the context server.

10. The method of claim 9 further comprising:
generating a billing record for the call in the SCP and providing the billing record to a billing server.

11. The method of claim 10 further comprising:
in the operator center, generating and transmitting a billing information message to the context server in response to providing the service to the call.

12. The method of claim 11 further comprising:
receiving the billing information message in the context server; and
processing the billing information message in the context server to generate and provide a billing request message to the SCP.

13. The method of claim 12 further comprising:
receiving the billing request message in the SCP; and
processing the billing request message in the SCP to generate a second billing record for the billing server.

14. The method of claim 2 wherein the first call handling information identifies a connection to the selected operator center.

15. The method of claim 7 wherein the second call handling information identifies a switch that is connected to the call destination.

16. The method of claim 4 wherein the first context request message and the second context request message includes a template ID that specifies a requested subset of the context information.

17. The method of claim 1 wherein the context information includes a switch ID that identifies an originating switch in the communications network for the call.

18. The method of claim 1 wherein the context information includes an SCP ID.

19. The method of claim 1 wherein the context information includes a called number.

20. The method of claim 1 wherein the context information includes a calling number.

21. The method of claim 1 wherein the context information includes a nature of called number and a nature of calling number.

22. The method of claim 1 wherein the context information includes a query sequence number.

23. The method of claim 1 wherein the context information includes DNIS digits.

24. The method of claim 9 wherein the second context information includes information from the operator server.

25. The method of claim 6 further comprising:
in response to providing the transfer message to the communications network, generating third context information for the call and providing the third context information to the context server.

26. The method of claim 25 wherein the third context information includes an account code.

27. The method of claim 25 wherein the third context information includes a credit card number.

28. The method of claim 25 wherein the third context information includes a calling card number.

29. The method of claim 25 wherein the third context information includes a social security number.

30. The method of claim 25 wherein the third context information includes caller-entered digits.

31. The method of claim 25 wherein the context information includes the out-dial number.

32. The method of claim 25 wherein the third context information includes a call-leg sequence.

33. A system for handling a call in a communications network, the system comprising:
a context server configured to receive context information for a call, store the context information, and provide the context information for a call;
a Service Control Point ("SCP") configured to receive and process a first query message from the communications network to establish context information for the call, provide the context information to the context server, generate a second query message, process a first response message to generate a second response message for the communications network that includes first call handling information, wherein the first query message includes a request for the first call handling information and wherein the second query message includes a request for an optimal operator center;
an operator server configured to receive the second query message and process the second query message to retrieve the context information for the call from the context server, select an optimal operator center for the call from a plurality of available operator centers based on the context information, and generate the first response message for the SCP, wherein the first response message indicates the selected operator center.

34. The system of claim 33 further comprising:
wherein the operator server is configured to process the second query message to generate a context information message for the selected operator center that includes the context information for the call and provide the context information message to the selected operator center.

35. The system of claim 33 wherein the operator server is configured to provide a first context request message to the context server and process a first context response message from the context server that includes the context information for the call and the context server is configured to receive and process the first context request message to generate the first context response message.

36. The system of claim 35 further comprising:
a plurality of operator centers, wherein a selected one of the plurality of operator centers is configured to receive the call, process the call to provide a second context request message to the context server that includes a request for the context information for the call and receive a second context response message that includes the context information for the call, wherein the context server is configured to receive and process the second context request message to generate the second context response message.

37. The system of claim 36 the selected one of the operator centers is configured to process the call to provide a service to the call and in response to providing the service, provide a transfer message to the communications network, wherein the transfer message causes the telecommunication's network to extend the call over a new connection to a call destination.

38. The system of claim 33 wherein the operator server is configured to process the second query message to select an optimal group of operator centers from the plurality of available operator centers based on the context information and provide and wherein the first response message indicates the selected group of operator centers to the SCP.

39. The system of claim 37 wherein the SCP is configured to provide second context information for the call to the context server in response to generating the second response message for the communications network.

40. The system of claim 39 wherein the SCP is configured to provide a billing record for the call to a billing server.

41. The system of claim 40 wherein the operator center is configured to provide a billing information message to the context server in response to providing the service to the call.

42. The system of claim 41 wherein the context server is configured to receive the billing information message and process the billing information message to generate and provide a billing request message to the SCP.

43. The system of claim 42 wherein the SCP is configured to receive the billing request message and process the billing request message to generate a second billing record for the billing server.

44. The system of claim 34 wherein the first call handling information identifies a connection to the selected operator center.

45. The system of claim 36 wherein the first context request message and the second context request message includes a template ID that specifies a requested subset of the context information.

46. The system of claim 33 wherein the context information includes a switch ID that identifies an originating switch in the communications network for the call.

47. The system of claim 33 wherein the context information includes an SCP ID.

48. The system of claim 33 wherein the context information includes a called number.

49. The system of claim 33 wherein the context information includes a calling number.

50. The system of claim 33 wherein the context information includes a nature of called number and a nature calling number.

51. The system of claim 33 wherein the context information includes a query sequence number.

52. The system of claim 33 wherein the context information includes DNIS digits.

53. The system of claim 33 wherein the operator center is further configured to provide third context information for the call to the context server in response to transmitting the transfer message to the communications network.

54. The system of claim 53 wherein the third context information includes an account code.

55. The system of claim 53 wherein the third context information includes a credit card number.

56. The system of claim 53 wherein the third context information includes a calling card number.

57. The system of claim 53 wherein the third context information includes a social security number.

58. The system of claim 53 wherein the third context information includes caller-entered digits.

59. The system of claim 53 wherein the context information includes the out-dial number.

60. The system of claim 53 wherein the third context information includes a call-leg sequence.

* * * * *

UNITED STATES PATENT AND TRADEMARK OFFICE
CERTIFICATE OF CORRECTION

PATENT NO.    : 6,760,426 B2
DATED         : July 6, 2004
INVENTOR(S)   : Daniel Charles Sbisa and Keith Eric Fenton It is certified that error appears in the above-identified patent and that said Letters Patent is hereby corrected as shown below:

Column 10,
Line 23, replace "query message for an operator saver, wherein the" with -- query message for an operator server, wherein the --

Signed and Sealed this

Seventh Day of September, 2004

JON W. DUDAS
*Director of the United States Patent and Trademark Office*